(12) United States Patent
Millar

(10) Patent No.: US 11,102,942 B2
(45) Date of Patent: Aug. 31, 2021

(54) SYSTEMS AND METHODS FOR REMOVING DEFECTIVE SEEDS AND PLANTS IN A GROW POD

(71) Applicant: Grow Solutions Tech LLC, Lehi, UT (US)

(72) Inventor: Gary Bret Millar, Highland, UT (US)

(73) Assignee: Grow Solutions Tech LLC, Vineyard, UT (US)

( * ) Notice: Subject to any disclaimer, the term of this patent is extended or adjusted under 35 U.S.C. 154(b) by 648 days.

(21) Appl. No.: 15/987,544

(22) Filed: May 23, 2018

(65) Prior Publication Data

US 2018/0359901 A1    Dec. 20, 2018

Related U.S. Application Data

(60) Provisional application No. 62/519,304, filed on Jun. 14, 2017, provisional application No. 62/519,652, filed on Jun. 14, 2017.

(51) Int. Cl.
*A01G 31/04* (2006.01)
*B25J 15/06* (2006.01)
(Continued)

(52) U.S. Cl.
CPC .......... *A01G 31/042* (2013.01); *A01B 41/00* (2013.01); *A01G 9/08* (2013.01); *A01G 9/143* (2013.01); *B25J 15/0019* (2013.01); *B25J 15/0616* (2013.01); *G05B 19/4182* (2013.01); *B65G 2207/24* (2013.01); *G01N 2021/0125* (2013.01); *G01N 2021/1776* (2013.01);
(Continued)

(58) Field of Classification Search
CPC .................. G01N 2021/8466; A01G 31/042
See application file for complete search history.

(56) References Cited

U.S. PATENT DOCUMENTS

| 5,088,231 A | 2/1992 | Kertz | |
|---|---|---|---|
| 6,065,463 A * | 5/2000 | Martin | A21B 1/245 126/21 A |

(Continued)

FOREIGN PATENT DOCUMENTS

| JP | 2013051939 A | 9/2011 |
|---|---|---|
| WO | 2005031367 A2 | 4/2005 |

(Continued)

OTHER PUBLICATIONS

International Search Report dated Sep. 21, 2018.

*Primary Examiner* — Thomas Randazzo
(74) *Attorney, Agent, or Firm* — Dinsmore & Shohl LLP

(57) ABSTRACT

A system for removing seeds includes a track, one or more carts moveably disposed on the track, one or more sensors, a removing device, and a controller. The controller includes one or more processors, one or more memory modules, and machine readable instructions stored in the one or more memory modules that, when executed by the one or more processors, cause the controller to determine a location of one or more of one or more contaminated seeds and one or more contaminated plants on the one or more carts based on information received from the one or more sensors and instruct the removing device to remove one or more of the one or more contaminated seeds and the one or more contaminated plants based on the location.

20 Claims, 8 Drawing Sheets

(51) Int. Cl.
  *B25J 15/00*  (2006.01)
  *G01N 21/84* (2006.01)
  *A01G 9/14* (2006.01)
  *A01G 9/08* (2006.01)
  *G05B 19/418* (2006.01)
  *A01B 41/00* (2006.01)
  *G01N 21/01* (2006.01)
  *G01N 21/17* (2006.01)

(52) U.S. Cl.
  CPC ............... *G01N 2021/845* (2013.01); *G01N 2021/8466* (2013.01); *G05B 2219/39102* (2013.01)

(56) References Cited

U.S. PATENT DOCUMENTS

| | | | |
|---|---|---|---|
| 6,508,033 B2 | 1/2003 | Hessel et al. | |
| 6,657,656 B1* | 12/2003 | Ueda | G01N 21/956 257/E23.179 |
| 9,756,771 B2 | 9/2017 | Redden | |
| 2002/0070150 A1* | 6/2002 | Keller | A01C 7/042 209/643 |
| 2005/0082207 A1* | 4/2005 | Deppermann | G01N 35/025 209/592 |
| 2012/0125739 A1* | 5/2012 | Manning | B65G 17/086 198/778 |
| 2013/0110280 A1* | 5/2013 | Folk | B25J 9/1697 700/215 |
| 2014/0227769 A1* | 8/2014 | Strobbe | C12N 5/0607 435/287.1 |
| 2015/0041372 A1* | 2/2015 | Chou | G05B 19/4182 209/577 |
| 2015/0147141 A1* | 5/2015 | Truyens | B65G 47/918 414/222.07 |
| 2016/0050852 A1* | 2/2016 | Lee | B25J 5/007 47/1.44 |
| 2018/0014486 A1* | 1/2018 | Creechley | A01G 2/20 |
| 2019/0000019 A1* | 1/2019 | Alexander | B25J 9/1679 |
| 2019/0021238 A1* | 1/2019 | Alexander | B25J 19/023 |

FOREIGN PATENT DOCUMENTS

| | | | |
|---|---|---|---|
| WO | 2010063075 A1 | 12/2008 | |
| WO | 2011125965 A1 | 4/2010 | |
| WO | 2013066254 A1 | 5/2013 | |
| WO | WO-2013066254 A1 * | 5/2013 | ............. A01G 9/143 |

* cited by examiner

SYSTEMS AND METHODS FOR REMOVING DEFECTIVE SEEDS AND PLANTS IN A GROW POD

CROSS REFERENCE TO RELATED APPLICATIONS

This application claims the benefit of U.S. Provisional Patent Application Nos. 62/519,652 and 62/519,304 all filed on Jun. 14, 2017, the entire contents of which are herein incorporated by reference.

TECHNICAL FIELD

Embodiments described herein generally relate to systems and methods for removing defective seeds and plants in a grow pod and, more specifically, to identifying defective seeds and plants using sensors and removing the defective seeds and plants using a robot arm.

BACKGROUND

While crop growth technologies have advanced over the years, there are still many problems in the farming and crop industry today. As an example, while technological advances have increased efficiency and production of various crops, many factors may affect a harvest, such as weather, disease, infestation, and the like. Additionally, while the United States currently has suitable farmland to adequately provide food for the U.S. population, other countries and future populations may not have enough farmland to provide the appropriate amount of food.

SUMMARY

In one embodiment, a system for removing seeds includes a track, one or more carts moveably disposed on the track, one or more sensors, a removing device, and a controller. The controller includes one or more processors, one or more memory modules, and machine readable instructions stored in the one or more memory modules that, when executed by the one or more processors, cause the controller to determine a location of one or more of one or more contaminated seeds and one or more contaminated plants on the one or more carts based on information received from the one or more sensors and instruct the removing device to remove one or more of the one or more contaminated seeds and the one or more contaminated plants based on the location.

In another embodiment, a method of removing one or more of contaminated seeds and contaminated plants from a cart comprising one or more trays travelling along a track in a grow pod includes receiving, by a controller of the grow pod, data from one or more sensors associated with one or more cells of the one or more trays, determining, by the controller of the grow pod, one or more contaminated seeds and one or more contaminated plants based on data from the one or more sensors, determining, by the controller of the grow pod, a location of one or more of the one or more contaminated seeds and the one or more contaminated plants in response to a determination of the one or more contaminated seeds and the one or more contaminated plants, and transmitting, by the controller of the grow pod, an instruction for removing one or more of the one or more contaminated seeds and the one or more contaminated plants based on the location.

In another embodiment, a grow pod for growing one or more plants includes a track comprising a plurality of curved track sections and a plurality of straight track sections, one or more carts moveably disposed on the track, one or more sensors, a removing device, and a controller. The controller includes one or more processors, one or more memory modules, and machine readable instructions stored in the one or more memory modules that, when executed by the one or more processors, cause the controller to determine a location of one or more of one or more contaminated seeds and one or more contaminated plants on the one or more carts based on information received from the one or more sensors, and instruct the removing device to remove one or more of the one or more contaminated seeds and the one or more contaminated plants based on the location.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for removing defective seeds and plants in a grow pod. Some embodiments are configured with a grow pod that includes a cart that houses at least one seed or plant, one or more sensors configured to detect contamination of the seed or plant, a robot arm, and a master controller. The master controller receives data from one or more sensors associated with one or more cells of a cart; determines whether a seed or plant is defective based on the data from the sensors; determines a location of the defective seed or plant in response to a determination that one or more of the seed and plant are defective; moves the robot arm proximate to the location and removes the defective seed or plant. The systems and methods for providing an assembly line grow pod incorporating the same will be described in more detail below.

Figure 1:
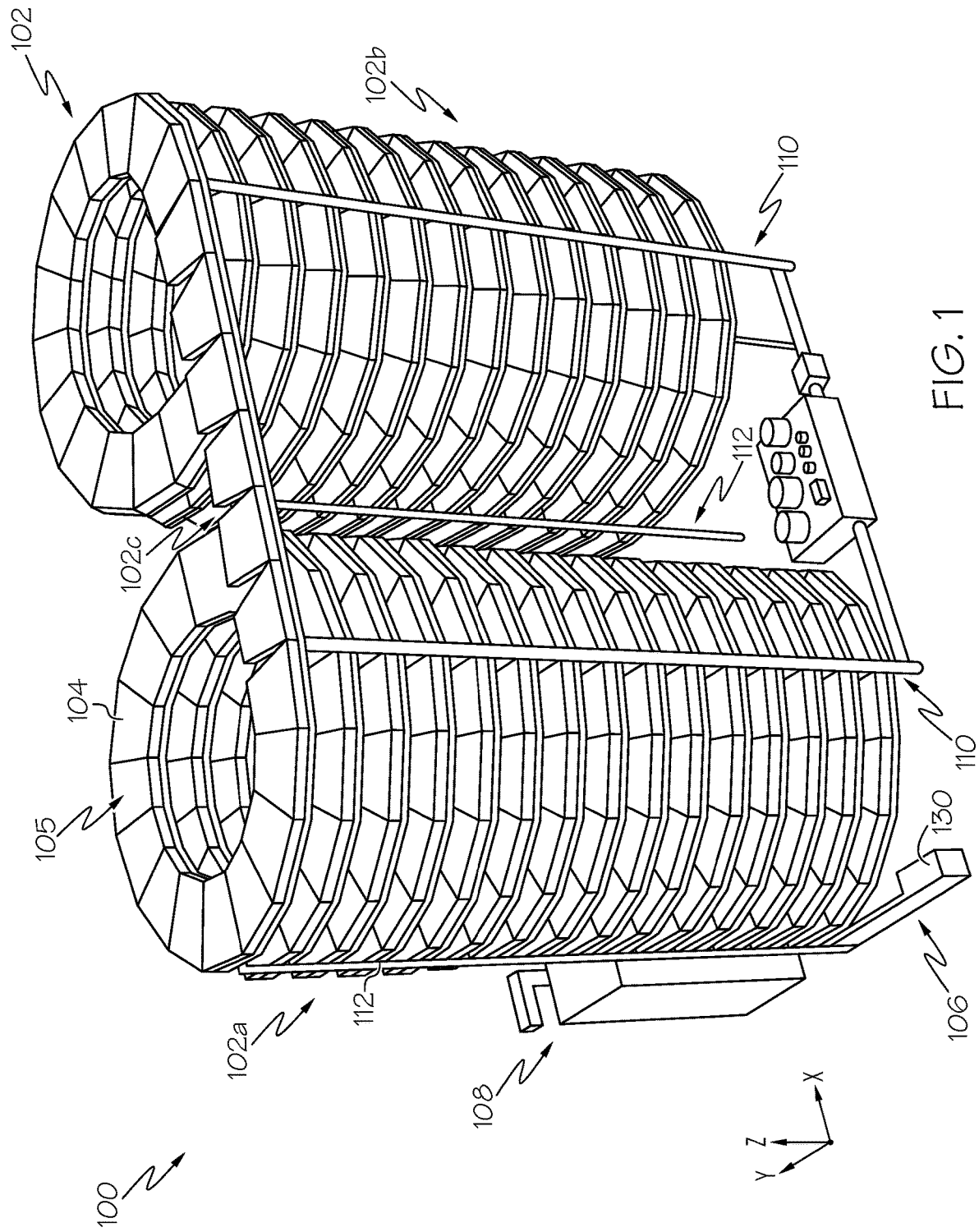
FIG. 1 depicts an assembly line grow pod that includes a transportation track for an industrial cart, according to embodiments described herein.

Referring now to the drawings, FIG. 1 depicts an assembly line grow pod 100 that includes a track 102 for receiving one or more carts 104 configured to carry a plurality of trays 105, according to embodiments described herein. The one or more carts 104 may be industrial carts. The assembly line grow pod 100 may be positioned on an x-y plane (i.e., the ground) as shown in FIG. 1. Each of the one or more industrial carts 104 may include one or more wheels rotatably coupled to the industrial cart 104 and supported on the track 102. For example, embodiments of the industrial cart 104 may include four wheels supported on the track 102, two wheels on each a left and a right side of the industrial cart 104.

A drive motor 103 may be coupled to at least one of the one or more wheels 222a, 222b to propel the industrial cart 104 along the track 102 in response to a signal transmitted to the drive motor 103. In other embodiments, the drive motor 103 may be rotatably coupled to the track 102. For example, without limitation, the drive motor 103 may be rotatably coupled to the track 102 through one or more gears which engage a plurality of teeth arranged along the track 102 such that the industrial cart 104 may be propelled along the track 102.

In some embodiments, the track 102 may consist of a plurality of modular track sections. The plurality of modular track sections may include a plurality of straight modular track sections and a plurality of curved modular track sections. The track 102 may include an ascending portion 102a, a descending portion 102b, and a connecting portion 102c. The ascending portion 102a and the descending portions 102b may comprise the plurality of curved modular track sections. The ascending portion 102a may wrap around (e.g., in a counterclockwise direction as depicted in FIG. 1) a first track axis such that the industrial carts 104 ascend upward in a vertical direction. The first track axis may be parallel to the z axis as shown in FIG. 1 (i.e., perpendicular to the x-y plane). The plurality of curved modular track sections of the ascending portion 102a may be tilted relative to the x-y plane (i.e., the ground) by a predetermined angle.

The descending portion 102b may be wrapped around a second track axis (e.g., in a counterclockwise direction as depicted in FIG. 1) that is substantially parallel to the first track axis, such that the industrial carts 104 may be returned closer to ground level. The plurality of curved modular track sections of the descending portion 102b may be tilted relative to the x-y plane (i.e., the ground) by a predetermined angle. In some embodiments, the tilt relative to the x-y plane of the modular track sections of the ascending portion 102a is substantially mirrored by the tilt relative to the x-y plane of the modular track sections of the descending portion 102b.

The connecting portion 102c may include a plurality of straight modular track sections. The connecting portion 102c may be relatively level with respect to the x-y plane (although this is not a requirement, for example, in embodiments in which the ascending portion 102a is not as tall as the descending portion and vice-a-versa) and is utilized to transfer the industrial carts 104 from the ascending portion 102a to the descending portion 102b. In some embodiments, one or more other connection portions (not shown in FIG. 1) may be positioned nearer to ground level. The one or more other connection portions may couple the descending portion 102b to the ascending portion 102a such that the industrial carts 104 may be transferred from the descending portion 102b to the ascending portion 102a. The one or more other connection portions may include a plurality of straight modular track sections.

Figure 2A:
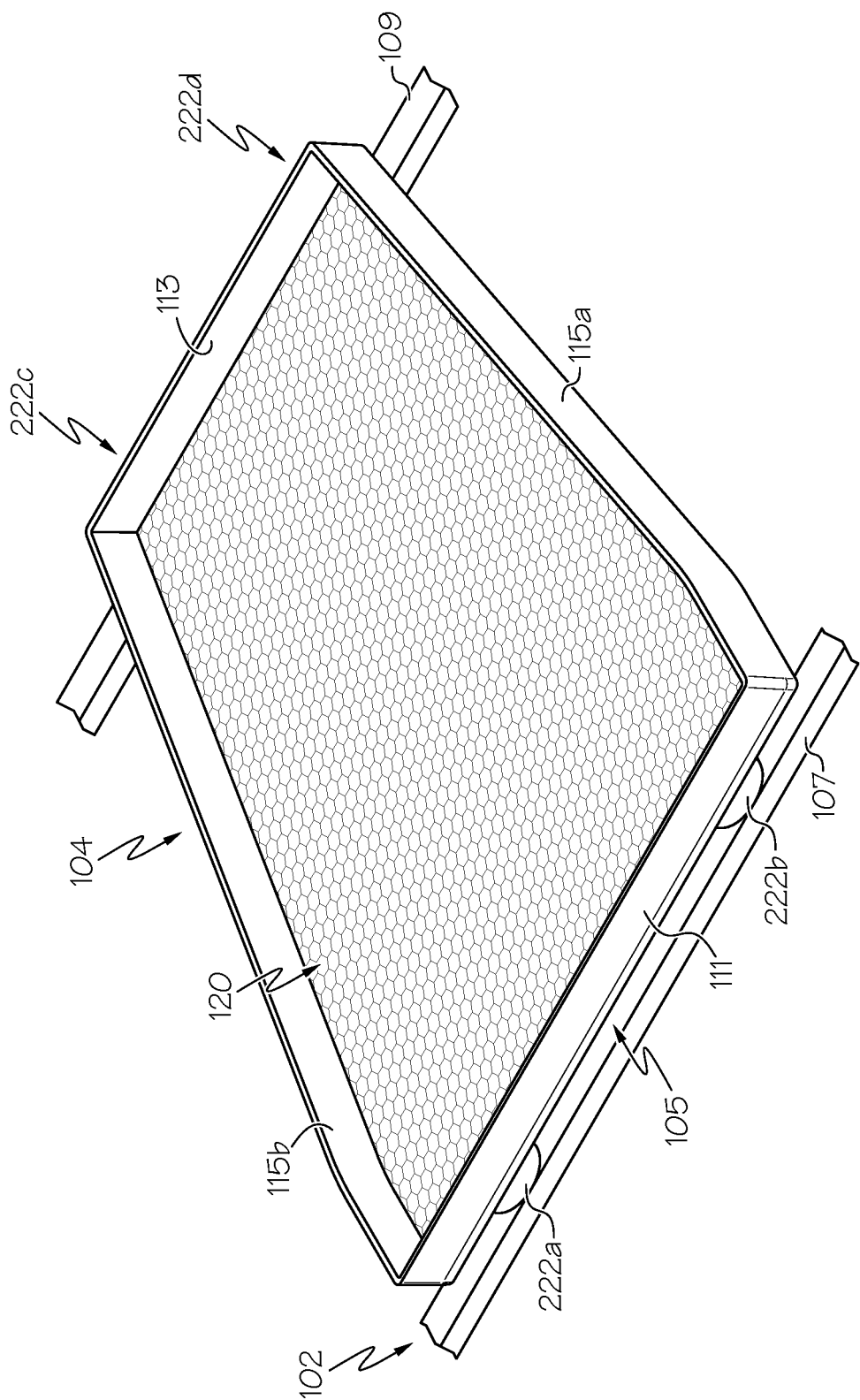
FIG. 2A depicts an illustrative tray supported by a cart on a track within an assembly line grow pod, according to one or more embodiments shown and described herein.

Briefly referring to FIG. 2A, in some embodiments, the track 102 may include two or more parallel rails 107, 109 that support the industrial cart 104 via the one or more wheels 222a, 222b rotatably coupled thereto. Referring back to FIG. 1, in some embodiments, at least two of the parallel rails of the track 102 are electrically conductive and capable of transmitting communication signals and/or power to and from the industrial cart 104. In yet other embodiments, a portion of the track 102 may be electrically conductive and a portion of the one or more wheels 222a, 222b may be in electrical contact with the portion of the track 102 that may be electrically conductive. In some embodiments, the track 102 may be segmented into more than one electrical circuit. That is, the electrically conductive portion of the track 102 may be segmented with a non-conductive section such that a first electrically conductive portion of the track 102 is electrically isolated from a second electrically conductive portion of the track 102 which is adjacent to the first electrically conductive portion of the track 102.

The communication signals and power may further be received and/or transmitted via the one or more wheels 222a, 222b of the industrial cart 104 and to and from various components of the industrial cart 104, as described in more detail herein. Various components of the industrial cart 104, as described in more detail herein, may include the drive motor, the control device, and one or more sensors.

In some embodiments, the communication signals and power signals may include an encoded address specific to an industrial cart 104 and each industrial cart 104 may include a unique address such that multiple communication signals and power may be transmitted over the same track 102 and received and/or executed by their intended recipient. For example, the assembly line grow pod 100 system may implement a digital command control system (DCC). DCC systems encode a digital packet having a command and an address of an intended recipient, for example, in the form of a pulse width modulated signal that is transmitted along with power to the track 102.

In such a system, each industrial cart 104 may include a decoder designated with a unique address, which may be the control device coupled to the industrial cart 104. When the decoder receives a digital packet corresponding to its unique address, the decoder executes the embedded command. In some embodiments, the industrial cart 104 may also include an encoder, which may be the control device coupled to the industrial cart 104, for generating and transmitting communications signals from the industrial cart 104, thereby enabling the industrial cart 104 to communicate with others of the industrial carts 104 positioned along the track 102 and/or other systems or computing devices communicatively coupled with the track 102.

While the implementation of a DCC system is disclosed herein as an example of providing communication signals along with power to a designated recipient along a common interface (e.g., the track 102) any system and method capable of transmitting communication signals along with power to and from a specified recipient may be implemented. For example, in some embodiments, digital data may be transmitted over AC circuits by utilizing a zero-cross, step, and/or other communication protocol.

Additionally, while not explicitly illustrated in FIG. 1, the assembly line grow pod 100 may also include a harvesting component, a tray washing component, and other systems and components coupled to and/or in-line with the track 102. In some embodiments, the assembly line grow pod 100 may include a plurality of lighting devices, such as light emitting diodes (LEDs). The lighting devices may be disposed on the track 102 opposite the industrial carts 104, such that the lighting devices direct light waves to the industrial carts 104 on the portion the track 102 directly below. In some embodiments, the lighting devices are configured to create a plurality of different colors and/or wavelengths of light, depending on the application, the type of plant being grown, and/or other factors. While in some embodiments, LEDs are utilized for this purpose, this is not a requirement. Any lighting device that produces low heat and provides the desired functionality may be utilized.

Figure 3A:
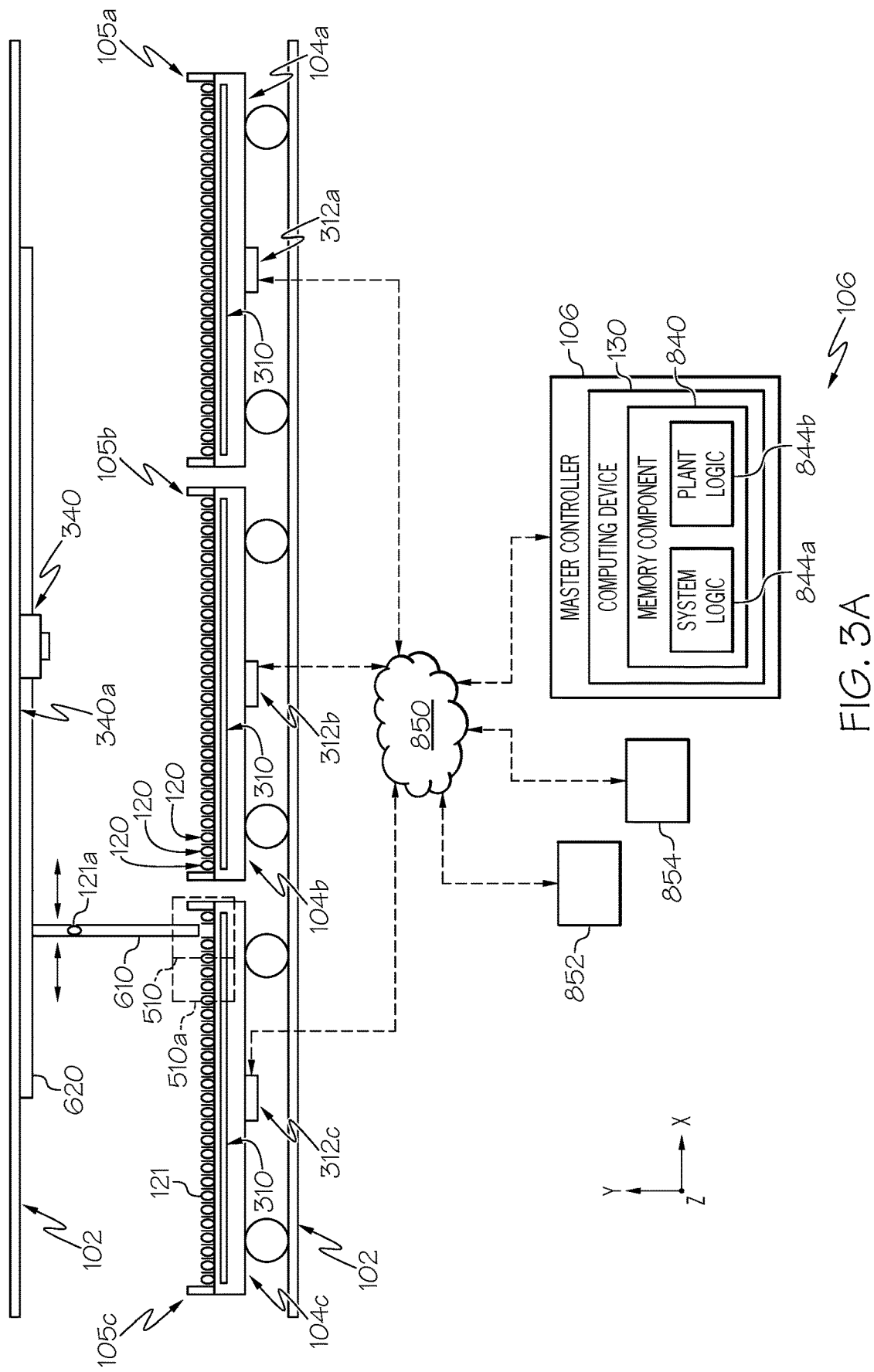
FIG. 3A depicts detecting defective seeds using various sensors and removing seeds that are contaminated from carts using a vacuum robot arm travelling along a first arm travel axis, according to one or more embodiments shown and described herein.

Also depicted in FIG. 1 is a master controller 106. The master controller 106 may include a computing device 130, a nutrient dosing component, a water distribution component, and/or other hardware for controlling various components of the assembly line grow pod 100. In some embodiments, the master controller 106 and/or the computing device 130 are communicatively coupled to a network, such as a network 850 (as depicted in FIG. 3A and to be described in greater detail herein).

A seeder component 108 may be coupled to the master controller 106. The seeder component 108 may be configured to seed one or more of the industrial carts 104 as the industrial carts 104 pass the seeder component 108 along the assembly line. Depending on the particular embodiment, each industrial cart 104 may include a single section tray for receiving a plurality of seeds. Some embodiments may include a multiple section tray for receiving individual seeds in each section (or cell). In the embodiments with a single section tray, the seeder component 108 may detect a presence of the respective industrial cart 104 and may begin laying seed across an area of the single section tray. The seed may be laid out according to a desired depth of seed, a desired number of seeds, a desired surface area of seeds, and/or according to other criteria. In some embodiments, the seeds may be pre-treated with nutrients and/or anti-buoyancy agents (such as water) as some of these embodiments may not utilize soil to grow the seeds and thus might need to be submerged.

In the embodiments where a multiple section tray is utilized with one or more of the industrial carts 104, the seeder component 108 may be configured to individually insert seeds into one or more of the sections of the tray. Again, the seeds may be distributed on the tray (or into individual cells) according to a desired number of seeds, a desired area the seeds should cover, a desired depth of seeds, etc.

A watering component may be coupled to one or more water lines 110, which distribute water and/or nutrients to one or more trays at predetermined areas of the assembly line grow pod 100. In some embodiments, seeds may be sprayed to reduce buoyancy and then flooded. Additionally, water usage and consumption may be monitored, such that at subsequent watering stations, this data may be utilized to determine an amount of water to apply to a seed at that time.

Also depicted in FIG. 1 are airflow lines 112. Specifically, the master controller 106 may include and/or be coupled to one or more components that delivers airflow for temperature control, humidity control, pressure control, carbon dioxide control, oxygen control, nitrogen control, etc. Accordingly, the airflow lines 112 may distribute the airflow at predetermined areas in the assembly line grow pod 100.

It should be understood that while some embodiments of the track 102 may be configured for use with an assembly line grow pod, such as the assembly line grow pod 100 depicted in FIG. 1, this is merely an example. The track 102 and mechanical and electrical track systems are not so limited and can be utilized for any track system where communication is desired.

FIG. 2A depicts an industrial cart 104 that may be utilized for the assembly line grow pod 100, according to embodiments described herein. As illustrated, the industrial cart 104 includes one or more wheels 222a, 222b, 222c, and 222d. The one or more wheels 222a, 222b, 222c, and 222d may be configured to rotatably couple with the track 102, as well as receive power, from the track 102. The track 102 may additionally be configured to facilitate communication with the industrial cart 104 through the one or more wheels 222a, 222b, 222c, and 222d.

The industrial cart 104 may include a tray 105. As shown in FIG. 2A, the tray 105 includes a plurality of cells 120 therein. Each cell of the plurality of cells 120 may support one or more seeds and/or plants. That is, each cell 120 has an open end in which the seed, water, soil, and/or nutrients are deposited and walls that prevent the seed, water, soil, and/or nutrients from escaping the cell. The plurality of cells 120 can be arranged in any manner on the tray 105, and such an arrangement is not limited by the present disclosure. As shown in FIG. 2A, each cell has a hexagonal shape and six side walls, however, cells are not limited to this geometry. For example, it is contemplated that cells can have three, four, five, or any other number of sidewalls.

As shown in FIG. 2A, the tray 105 may include a first wall 111, a second wall 113, and a pair of sidewalls 115a, 115b. In some embodiments, the first wall 111 may be longer than the second wall 113 and the tray 105 may form an isosceles trapezoidal shape. The isosceles trapezoidal shape may enable a line of trays shaped like the tray 105 to circle around the ascending portion 102a and the descending portion 102b without interfering with the travel of the trays immediately adjacent to the tray 105. That is, as the tray 105 begins to turn on the track 102 around the curved portions of the ascending portion 102a and the descending portion 102b, the sidewalls 115a, 115b of one tray 105 will not interfere with the sidewalls 115a, 115b of another tray 105.

Figure 2B:
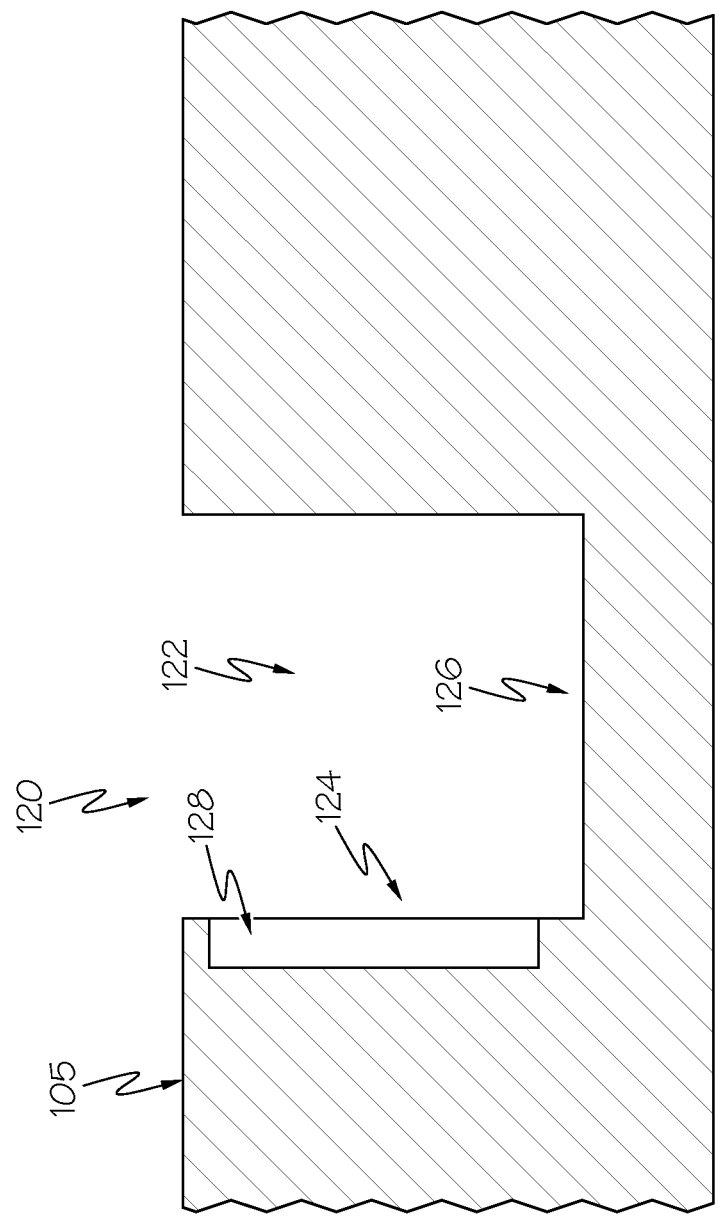
FIG. 2B depicts a cross sectional view of an illustrative cell within a tray according to one or more embodiments shown and described herein.

FIG. 2B depicts a cross-sectional side view of an illustrative cell 120 within the tray 105. The cell 120 has one or more side walls 124 and a base 126. The side walls 124 and the base 126 may define a cavity 122 in which the seeds, water, soil, and/or nutrients can be deposited at various locations on the assembly line grow pod 100. The shape and size of each cell 120 is not limited by this disclosure, and may generally be any shape and/or size suitable for holding a seed, water, soil, and/or nutrients therein. The cell 120 may also be of sufficient size to contain any plant that sprouts from the seed before the plant is harvested. In some embodiments, the shape and/or size of the cell 120 may be based on the type, number, or size of the seed and/or plant that is to be held in the cell 120. Some trays 105 may include a single type of cell 120. Some trays 105 may include multiple types of cells 120.

Each cell 120 may be coupled to a device that measures various characteristics of the contents of the cell 120 such that a determination can be made as to whether the cell contains contaminants therein, for example, one or more of the specific contaminants listed herein. Accordingly, one of the one or more side walls 124 of the cell may be coupled to (or embedded with) a contaminant sensor 128. The contaminant sensor 128 may be a circuit board or the like that contains various components, traces, and/or the like for testing for one or more indicators of a presence of a contaminant within the cell 120. The contaminant sensor 128 may transmit data about the presence of a contaminant within the cell 120 to a master controller, such as the master controller 106 shown in FIG. 3A.

FIG. 3A depicts a scenario in which defective seeds are detected in one of the trays 105a, 105b, 105c supported by carts 104a, 104b, and 104c using various sensors, and removed using a removing device, such as a vacuum robot arm, according to embodiments described herein. As shown in FIG. 3A the removing device is a vacuum robot arm, but other types of removing devices are considered. For example, the removing device may be a removing robot arm that is configured to access the underside of a cell, open the cell, and allow gravity to drop the cell into a reservoir. In other embodiments, the removing device may be a cutting robot arm that may be configured at least to cut one or more plants as will be described in greater detail herein. In some embodiments, the removing device may be a siphon for removing water or other liquid particulate from the cells. In some embodiments, the removing device may be a shovel or a spade.

Carts 104a, 104b, and 104c move along the track 102 in +x direction. In the reference frame depicted in FIG. 3A, moving in the +x direction is equivalent to moving up the ascending portion 102a, across the connecting portion 102c, or down the descending portion 102b of FIG. 1.

Each of the carts 104a, 104b, and 104c has a tray 105a, 105b, 105c including a plurality of cells 120 as shown in FIG. 2A. Each of the plurality of cells 120 may contain one or more seeds 121. While the track 102 is illustrated as a straight track in FIG. 4, the track 102 may be a curved track. The carts 104a, 104b, and 104c each include a weight sensor 310, respectively. The weight sensors 310 are configured to measure the weight of a payload on the carts, such as seeds. The weight sensors 310 may expand substantially beneath the entire area seeded area of the plurality of cells 120 under the tray 105. In some embodiments, the weight sensors 310 may be embedded in the tray 105. In embodiments, the weight sensors 310 may be configured to detect the weight of individual cells 120, the weight of a group of cells, or the weight of the tray 105 as a whole, or some combination thereof. For example, the weight sensors 310 may be configured to measure the weight of one individual cell 120 and/or to measure the weight of a particular number of cells, e.g. five cells, together in the same tray 105. In this way, the weight sensors 310 can determine data useful to detect an individually defective seed or plant, a collection of defective seeds or plants, or some combination of the two.

The carts 104a, 104b, and 104c may also include cart computing devices 312a, 312b, and 312c, respectively. The cart computing devices 312a, 312b, 312c may include at least a programmable non-transient machine-readable storage device, such as a memory, and one or more processing devices. The processing devices may be any type of device for executing machine-readable instructions. The cart computing devices 312a, 312b, and 312c may be communicatively coupled to the weight sensors 310 and receive weight information from the weight sensors 310. The cart computing devices 312a, 312b, and 312c may comprise communications hardware, for example, wireless network interface hardware for communicating with the master controller 106 through a network 850. In some embodiments, the cart computing devices 312a, 312b, 312c may communicate with the master controller 106 via a wired connection.

A camera 340 or other image capture device may be positioned over the carts 104a, 104b, and 104c and a lens or other visual data-receiving portion of the camera may be aimed at the carts 104a, 104b, 104c. The camera 340 may be a visual, infrared, thermal or other type of camera configured to receive visual, infrared, thermal, or other radiation from a subject, for example, the trays 105a, 105b, 105c. The camera 340 may capture an image or other visual data, for example infrared data, of the seeds or other contents of the cells 120 in the tray 105. The camera 340 may have a wide angle lens or otherwise be configured to capture image data from more than one tray at a time. For example, the camera 340 shown in FIG. 3A may capture data associated with each of the carts 104a, 104b, and 104c simultaneously.

The camera 340 may include one or more filters for filtering unwanted or unnecessary data. Data may be filtered using software, mechanical, or electrical means. For example, in some embodiments, software may filter unwanted data from a digital image of the tray 105. In other embodiments, a filtering lens may be placed over the lens of the camera 340. In some embodiments, the camera 340 may capture the natural colors of the plants.

The camera 340 may be attached under a portion of the track 102. The camera 340 may be configured to travel along a length of the track 102, up the ascending portion 102a, across the connecting portion 102c, and down the descending portion 102b. In some embodiments, one or more cameras, such as the camera 340, may be located at various static positions along the track and be configured to receive images of the one or more carts 104 as the carts 104 travel along the track 102. In some embodiments, the locations of one or more cameras, such as the camera 340, may be dynamic such that the camera 340 can move along the track 102 as the carts 104 move along the track. For example, the camera 340 may be coupled to the track 102 and include one or more motors and one or more wheels such that the camera 340 is configured to travel on an undercarriage 340a of the track 102. The undercarriage 340a may extend an entire length of the track 102 or may only positioned along discrete portions under the track 102. The camera 340 may be configured to move from cart to cart to capture visual data from each cart and/or may be configured to move along the track 102 associated with an individual cart or carts 104 until it has captured all the visual data necessary to make a determination as to whether one or more cells in the associated cart or carts contain contaminated seeds and/or plants.

The camera 340 may have wireless network interface hardware for communicating with the master controller 106 through a network, such as the network 850. The camera 340 may connect with the network 850 and/or the master controller 106 using any wireless data transfer protocol, for example Bluetooth, Bluetooth Low Energy, ZigBeeZ-Wave, 6LoWPAN, 2G, 3G, 4G, 5G, LTE, RFID, SigFox, or some other wireless data transfer protocol. The network interface hardware may include and/or be configured for communicating with any wired or wireless networking hardware, including an antenna, a modem, LAN port, wireless fidelity (Wi-Fi) card, WiMax card, ZigBee card, Z-Wave card, Bluetooth chip, USB card, mobile communications hardware, and/or other hardware for communicating with other networks and/or devices.

Still referring to FIG. 3A, the master controller 106 may include one or more computing devices, such as the computing device 130. The computing device 130 may include a storage device for storing non-transient, machine-readable instructions, such as the memory component 840. The memory component 840 may store, among other things, systems logic 844a and plant logic 844b. As described in more detail below, the systems logic 844a may monitor and control operations of one or more of the components of the assembly line grow pod 100. For example, the systems logic 844a may monitor and control operations of the camera 340, the contaminant sensors 128, and the weight sensors 310. The plant logic 844b may be configured to determine and/or receive a recipe for plant growth and may facilitate implementation of the recipe via the systems logic 844a.

Additionally, the master controller 106 may be coupled to a network, such as the network 850. The network 850 may include the internet or other wide area network, a local network, such as a local area network, a near field network, such as Bluetooth or a near field communication (NFC) network. The network 850 may also couple to a user computing device 852 and/or a remote computing device 854.

The user computing device 852 may include a personal computer, laptop, mobile device, tablet, server, etc. and may be utilized as an interface with a user. For example, the user computing device 852 may provide an interface to a user for the purposes of adjusting settings (e.g., an amount of nutrients/water to be supplied, a type and amount of ambient air conditions to be supplied, etc.), viewing a status (e.g., receiving a notification of an error, a status of a particular valve or other component, etc.), and/or the like. A location and/or status of the one or more cells 120 may be communicated to a user via the user computing device 852. For example, one or more defective seeds and/or plants may be communicated to a user using the user computing device 852.

Similarly, the remote computing device 854 may include a server, personal computer, tablet, mobile device, etc. and may be utilized for machine to machine communications. As an example, if the master controller 106 determines a type of seeds being used (and/or other information, such as ambient conditions), the master controller 106 may communicate with the remote computing device 854 to retrieve a previously stored recipe for those conditions. As such, some embodiments may utilize an application program interface (API) to facilitate this or other computer-to-computer communications.

The master controller 106 may store and implement instructions that determine which seeds and/or plants in the trays 105 are defective (e.g., contaminated by contaminants, such as mold, bacteria, viruses, foreign particulate matter, decayed material, unnecessary and/or harmful minerals) based on at least one of the data from the contaminant sensors 128, the data from the weight sensors 310, and the data from the camera 340. For example, the master controller 106 may determine that seeds in an area 510 of the cart 104c are contaminated based on the data from one or more of the contaminant sensors 128, the camera 340, or the weight sensors 310, as shown in FIG. 3A. In the particular scenario shown, the master controller 106 may also determine that the carts 104a and 104b carry no defective seeds or plants.

FIG. 3A also shows a vacuum robot arm removing a contaminated seed 121a from the area 510 in the tray 105c in the cart 104c, according to embodiments described herein. The area 510 may be identified as an area with contamination or other impurities in the cells 120. The contaminated seeds or other impurities may be removed so that a contaminated plant does not grow in the cell 120 and so that the contamination does not spread to other cells 120 in the tray 105c. The master controller 106 may determine which portions or portion of a tray 105c to remove when a contaminated area is identified. For example, it may be determined that one or more anti-contamination buffers 510a around a contaminated cell or cells should be removed just to ensure that all of the contamination is removed even if the cell or cells in the anti-contamination buffer do not include contamination.

The vacuum robot arm 610 may extend downward from above the tray 105c. In embodiments, the vacuum robot arm 610 may be attached to a rail 620. The rail 620 may be placed under the track 102 such that the vacuum robot arm 610 may move in a +/−x direction. While FIG. 3A illustrates the vacuum robot arm 610 moving along the rail 620, any other mechanical structure may be used for the vacuum robot arm 610 to move in the assembly line grow pod 100.

A vacuum end 612 of the vacuum robot arm 610 may be configured to vacuum seeds or plants (along with any water nutrients, contaminants, etc.) proximate to the vacuum end 612. In some embodiments, the vacuum end 612 may include a filter or other mechanical device for preventing certain objects from entering the vacuum robot arm 610. For example, the vacuum robot arm 610 may include a filter that permits the passage of contaminants smaller than a seed or plant, but stops the vacuum from sucking up a seed or a plant.

The master controller 106 may control the movement of the vacuum robot arm 610. Once the area 510 where seeds are contaminated is identified, the master controller 106 may instruct the vacuum robot arm 610 to move to the area 510 and vacuum the contaminated seeds, as shown in FIG. 3A. The vacuum robot arm 610 may suck one contaminated seed, such as the contaminated seed 121a, at a time. In some embodiments, the vacuum robot arm 610 may suck more than one contaminated seed at a time.

In some embodiments, a blower may be used to remove contaminated seeds or other material from the cells 120. The blower may be placed above or beneath the cells 120 of the tray 105. In response to detecting contaminated seeds, the blower may move to the area 510 of the contaminated seeds. In some embodiments, the blower may blow the seeds out of the top of a cell 120 or through doors in the bottom of the cells 120.

In some embodiments, a vacuum device may be placed at the bottom of the cells of the cart. In response to detecting contaminated seeds, the vacuum device may move to the area 510 of the contaminated seeds and suck the seeds through doors in the bottom of the cells 120.

Figure 3B:
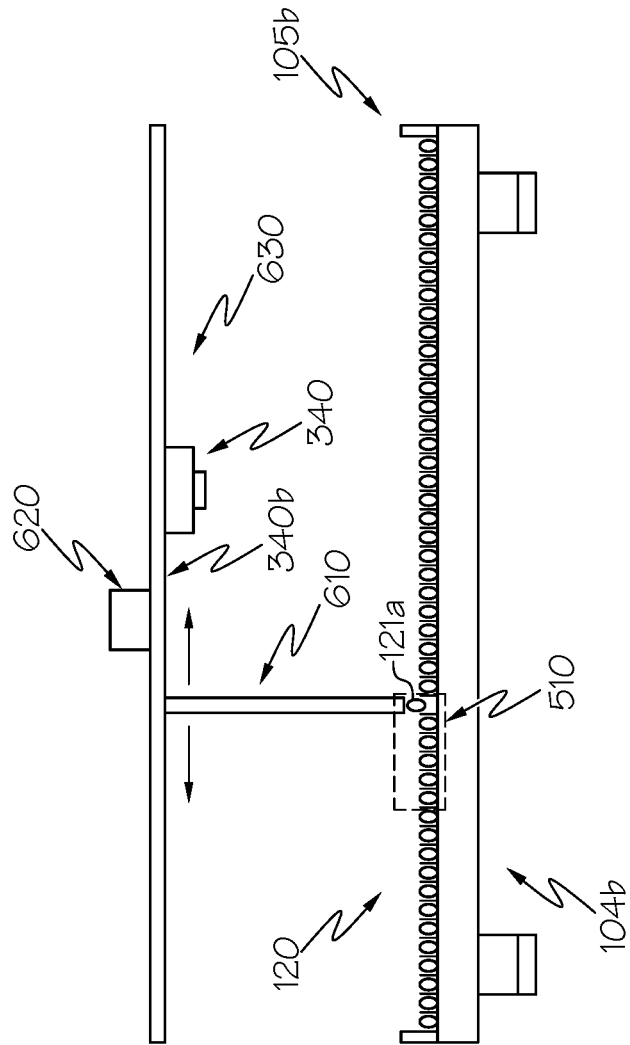
FIG. 3B depicts removing seeds that are contaminated from carts using a vacuum robot arm travelling along a second arm travel axis, according to one or more embodiments shown and described herein.

FIG. 3B depicts a y-z plane view of the cart 104c and the reference frame shown in FIG. 3A, according to embodiments described herein. As shown in FIG. 3B, the vacuum robot arm 610 may move along a second rail 630 that is perpendicular to the rail 620. That is, the vacuum robot arm 610 may move in a +/−z direction. The master controller 106 may control the vacuum robot arm 610 to move to the area 510 and vacuum the contaminated seeds as shown in FIG. 3B.

FIG. 3B depicts the vacuum robot arm removing the contaminated seed 121a from a cell 120 in the tray 105b on the cart 104b. The camera 340, the weight sensors 310, the contaminant sensors 128, or some other mechanism may be used to determine whether a seed is contaminated or not. In some embodiments, the vacuum robot arm 610 may be beneath the cart 104b and move in the y-z plane beneath the cart 104b to remove a contaminated seed or other debris from the cells 120. Additionally, in some embodiments, a blower may be used to remove the contaminated seed or other debris from the cells 120. The blower may move beneath a tray, such as the tray 105b, in the y-z plane or above a tray in the y-z plane.

FIG. 3B also depicts the camera 340 moving along a perpendicular undercarriage 340b. The perpendicular undercarriage 340b may be perpendicular to the undercarriage 340a. The camera 340 may move from side to side with respect to the trays 105 and/or carts 104 to capture visual data associated with the contents in the trays 105. In some embodiments, the camera 340 may be on the same arm as the vacuum robot arm 610 and/or the cutting robot arm 810 described in greater detail herein.

Figure 4:
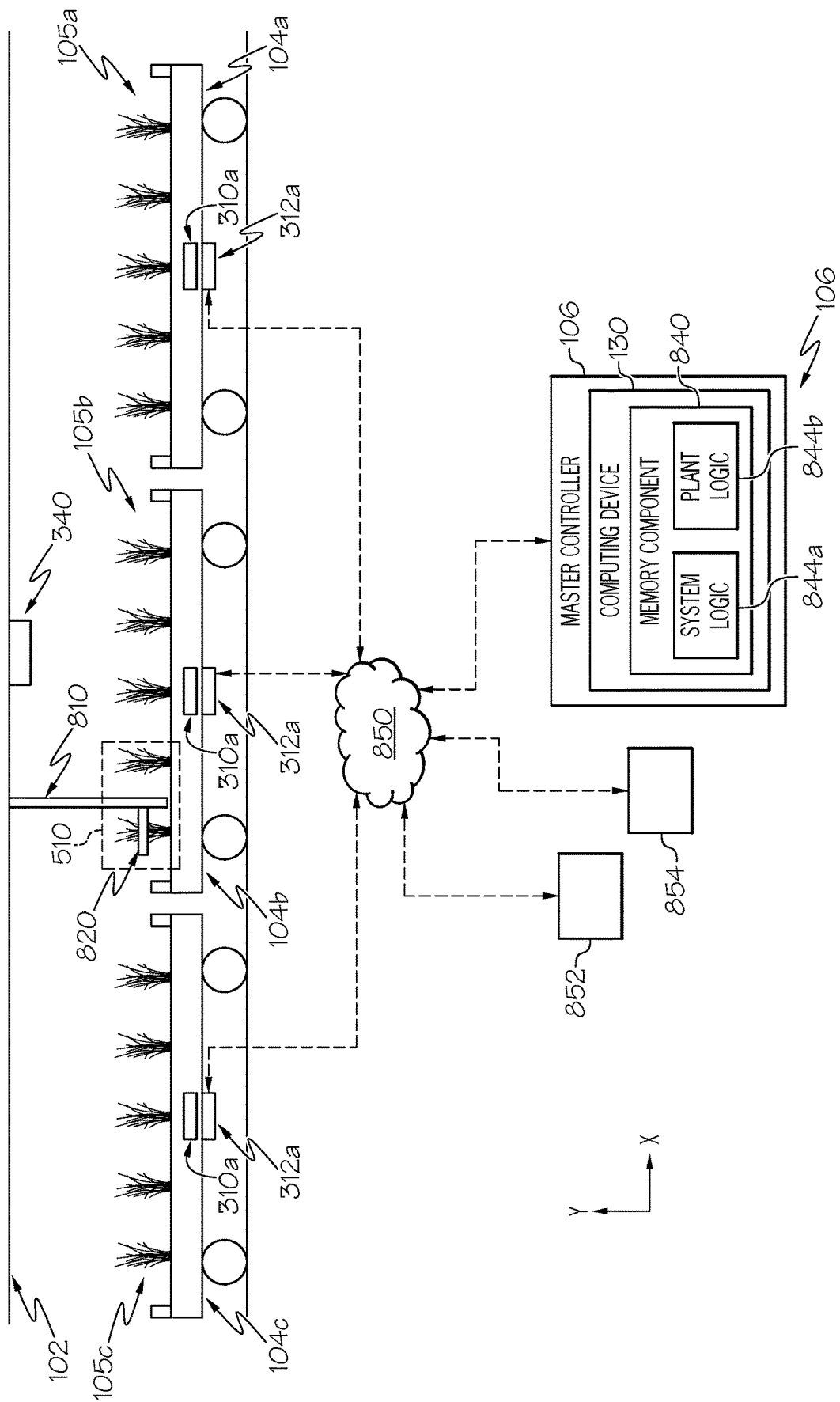
FIG. 4 depicts detecting defective plants using various sensors and removing defective plants from carts using a cutting robot arm, according to one or more embodiments shown and described herein.

While FIGS. 3A and 3B describe detecting and removing contaminated seeds, the master controller 106 may identify contaminated plants, flowers, fruits, nutrients, water, soil, etc., and remove the contaminated plants, flower, fruits, nutrients, water, soil, etc. using the vacuum robot arm 610 or some other implement described herein, such as, for example, the cutting robot arm 810 shown in FIG. 4.

FIG. 4 depicts cutting defective plants, according to embodiments described herein. Similar to the description with reference to FIGS. 3A and 3B, the master controller 106 may determine which plants are defective (e.g., contaminated by contaminants, such as mold, bacteria, viruses, foreign particulate matter, decayed material, unnecessary and/or harmful minerals) based on one or more of the data from the contaminant sensors 128, the data from the weight sensors 310, and the data from the camera 340. The master controller 106 may instruct a cutting robot arm 810 to move to the area where the plants are contaminated.

The cutting robot arm 810 may include a cutting element 820 at one end. The cutting element 820 of the cutting robot arm 810 may cut and remove the identified contaminated portion of the plants as shown in FIG. 4. In some embodiments, the cutting robot arm 810 may also include a vacuum function such that the cutting robot arm 810 cuts the contaminated portion of the plants and vacuums the cut portion or other portions of the plants.

Still referring to FIG. 4, the master controller 106 may include one or more computing devices, such as the computing device 130. The computing device 130 may include a storage device for storing non-transient, machine-readable instructions, such as the memory component 840. The memory component may store, among other things, systems logic 844a and plant logic 844b. As described in more detail herein, the systems logic 844a may monitor and control operations of one or more of the components of the assembly line grow pod 100. For example, the systems logic 844a may monitor and control operations of the camera 340, the contaminant sensors 128, and the weight sensors 310. The plant logic 844b may be configured to determine and/or receive a recipe for plant growth and may facilitate implementation of the recipe via the systems logic 844a.

Additionally, the master controller 106 may be coupled to a network, such as the network 850. The network 850 may include the internet or other wide area network, a local network, such as a local area network, a near field network, such as Bluetooth or a near field communication (NFC) network. The network 850 may also couple to a user computing device 852 and/or a remote computing device 854.

The user computing device 852 may include a personal computer, laptop, mobile device, tablet, server, etc. and may be utilized as an interface with a user. For example, the user computing device 852 may provide an interface to a user for the purposes of adjusting settings (e.g., an amount of nutrients/water to be supplied, a type and amount of ambient air conditions to be supplied, etc.), viewing a status (e.g., receiving a notification of an error, a status of a particular valve or other component, etc.), and/or the like. A location and/or status of the one or more cells 120 may be communicated to a user via the user computing device 852. For example, one or more defective seeds and/or plants may be communicated to a user using the user computing device 852.

Similarly, the remote computing device 854 may include a server, personal computer, tablet, mobile device, etc. and may be utilized for machine to machine communications. As an example, if the master controller 106 determines a type of seeds being used (and/or other information, such as ambient conditions), the master controller 106 may communicate with the remote computing device 854 to retrieve a previously stored recipe for those conditions. As such, some embodiments may utilize an application program interface (API) to facilitate this or other computer-to-computer communications.

The master controller 106 may store and implement instructions that determine which plants in the trays 105a, 105b, 105c are defective (e.g., contaminated by contaminants, such as mold, bacteria, viruses, foreign particulate matter, decayed material, unnecessary and/or harmful minerals) based on at least one of the data from the contaminant sensors 128, the data from the weight sensors 310, and the data from the camera 340. For example, the master controller 106 may determine that plants in an area 510 of the cart 104b are contaminated based on the data from the contaminant sensors 128, the camera 340, or the weight sensors 310, as shown in FIG. 4. The master controller 106 may also determine that the carts 104a and 104c carry no defective or contaminated plants. As shown in FIG. 4, the contaminated plant is cut and removed from the tray 105b on the cart 104b.

Figure 5:
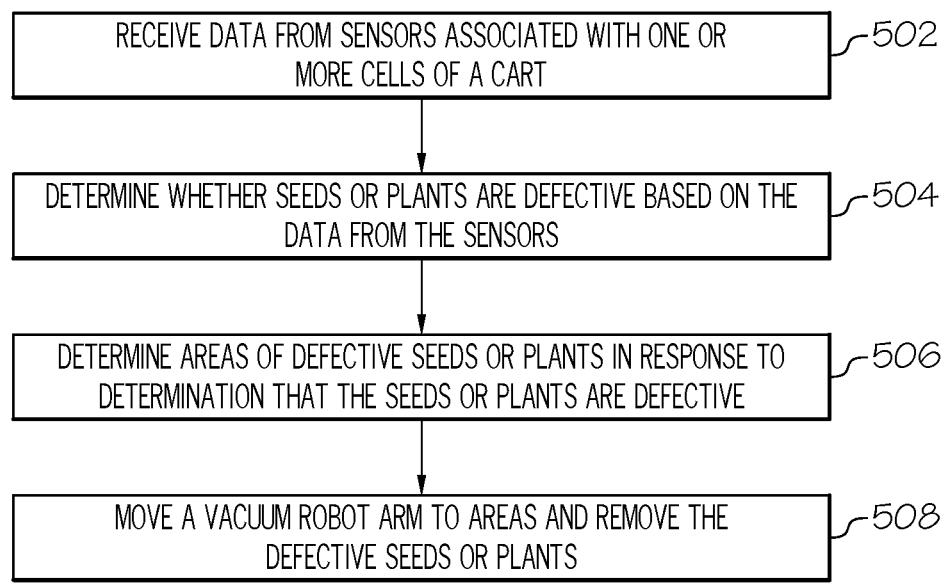
FIG. 5 depicts a flow diagram for removing contaminated seeds or plants from carts, according to one or more embodiments shown and described herein.

FIG. 5 depicts a flow diagram for removing contaminated seeds or plants from carts, according to embodiments described herein. As illustrated in block 502, the master controller 106 may receive data from sensors associated with one or more cells 120 of trays 105 disposed on the carts 104. For example, the master controller 106 may receive data from the contaminant sensors 128, data from the weight sensors 310, and/or data from the camera 340. The data from the contaminant sensors 128 may be contamination data, for example, data associated with one or more contaminants such as, but not limited to, mold, bacteria, excess water, plants, animal, and/or contaminated soil. The data from the weight sensors 310 may include a weight of the contents of the cell or cells 120. The camera 340 may produce visual data and the master controller 106 may receive this visual data, for example, without limitation, the camera 340 may generate data associated with visible, x-ray, or infrared light.

In block 504, the master controller 106 determines whether one or more of the seeds or plants in the trays 105 on the carts 104 are defective based on the data from the sensors. For example, the master controller 106 may determine the seeds or plants are defective based on data transmitted from the contaminant sensors 128. As another example, if the weight of one or more of the cells 120 transmitted from the weight sensor 310 is abnormally low or high relative to other cells or to an expected weight, the master controller 106 may determine that one or more of the cells 120 includes defective seeds or plants. The expected weight may be stored in a memory of the master controller 106. The expected weight may be based upon an average weight of the typical contents of the cells, for example, the typical weight of a seed of the type that is in the cells 120.

As another example, the master controller 106 may implement image processing on the image transmitted from the camera 340, and if a certain cell in the processed image shows a different color than others, the master controller 106 may determine that the certain cell includes defective seeds or plants. In some embodiments, data from the camera 340 may be processed using an image processing algorithm or object recognition algorithm. Any known or yet-to-be-developed image processing or object recognition algorithms may be used to extract the objects and features from the image data. Example object recognition algorithms include, but are not limited to, scale-invariant feature transform ("SIFT"), speeded up robust features ("SURF"), and edge-detection algorithms. In some embodiments, the classification of an object may include partitioning of image data into one or more segments based on a classification of the individual pixels in the image data. One or more image segmentation algorithms may be stored in a non-transitory computer readable memory communicatively coupled to the master controller 106 and applied to the image data generated by the camera 340. Example segmentation algorithms include, but are not limited to, thresholding algorithms, clustering algorithms, edge-detection algorithms, region-growing algorithms, and dual clustering algorithms.

In some embodiments, the data from the various sensor systems may be interpolated. For example, the data from the weight sensors 310 may be interpolated with the data from the camera 340.

In block 506, the master controller 106 may determine areas, such as areas 510, of defective seeds or plants in response to determination that the seeds or plants are defective. The areas 510 may include one or more cells 120. For example, the master controller 106 may determine the areas 510 of the defective seeds or plants based on the locations of weight sensors 310 for cells containing the defective seeds or plants. As another example, the master controller 106 may determine the areas 510 of the defective seeds or plants based on the locations of contaminant sensors 128 detecting contaminants. As another example, the master controller 106 may determine the areas 510 of the defective seeds or plants based on the image captured by the camera 340. In some embodiments, the master controller 106 may determine the areas 510 of defective seeds or plants based on a combination or interpolation of data from the one or more sensors.

In some embodiments, the areas 510 of defective seeds or plants may include the cells 120 that include defective seeds or plants and may also include a buffer around the cells 120 with defective seeds or plants, such as the anti-contamination buffer 510a of FIG. 3A. The buffer may not include seeds that are registered by the sensors as defective seeds or plants, but may be determined for removal by the vacuum robot arm as if they did contain defective seeds or plants. The buffer may prevent cells 120 that may contain defective seeds or plants that may not be detected by the one or more sensors from continuing through the entire grow pod.

In block 508, the master controller 106 instructs a robot arm to move to the areas 510 and remove the defective seeds or plants. As illustrated in FIGS. 3A, 3B, and 4, a vacuum robot arm 610 or a cutting robot arm 810 moves to the area 510 where seeds or plants are contaminated, and removes the contaminated seeds or plants. In some embodiments, the vacuum robot arm 610 and the cutting robot arm 810 may be implemented in a single robot arm. For example, a robot arm with a cutting tool and a vacuum tool incorporated into the robot arm. In such an instance, the cutting tool could cut the defective plant and the vacuum tool could remove the leaves, grass, or other debris associated with the cut plant after it is cut. Other accessories associated with the robot arm are possible.

Figure 6:
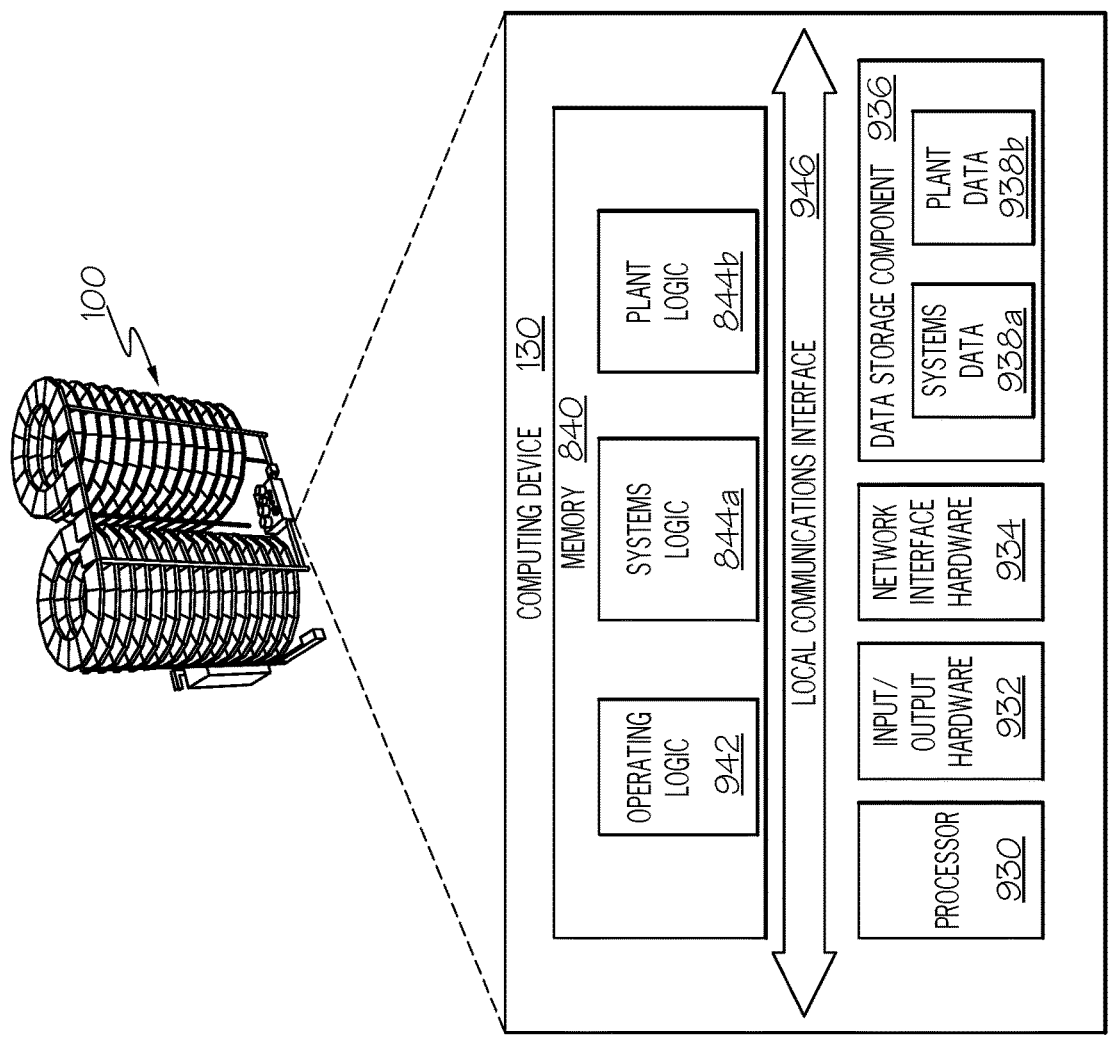
FIG. 6 depicts a computing device for an assembly line grow pod, according to one or more embodiments shown and described herein.

FIG. 6 depicts a computing device 130 for an assembly line grow pod 100, according to embodiments described herein. As illustrated, the computing device 130 includes a processor 930, input/output hardware 932, the network interface hardware 934, a data storage component 936 (which stores systems data 938a, plant data 938b, and/or other data), and the memory component 840. The memory component 840 may be configured as volatile and/or non-volatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the computing device 130 and/or external to the computing device 130.

The memory component 840 may store logic, such as the operating logic 942, the systems logic 844a, and the plant logic 844b. The systems logic 844a and the plant logic 844b may each include a plurality of different pieces of logic, each of which may be embodied as a computer program, firmware, and/or hardware, as an example. A local communications interface 946 is also included in FIG. 6 and may be implemented as a bus or other communication interface to facilitate communication among the components of the computing device 130.

The processor 930 may include any processing component operable to receive and execute instructions (such as from a data storage component 936 and/or the memory component 840). The input/output hardware 932 may include and/or be configured to interface with microphones, speakers, a display, and/or other hardware.

The network interface hardware 934 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the computing device 130 and other computing devices, such as the user computing device 852 and/or remote computing device 854 of FIGS. 3A and 4.

The operating logic 942 may include an operating system and/or other software for managing components of the computing device 130. As also discussed above, systems logic 844a and the plant logic 844b may reside in the memory component 840 and may be configured to perform the functionality, as described herein.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for removing defective seeds and/or plants from a grow pod. The defective seeds and/or plants may be removed from one or more trays travelling along a track in the grow pod. The grow pod may be outfitted with one or more sensors for detecting the defective seeds and/or plants and for removing the defective seeds and/or plants. Examples of the sensors include, but are not limited to, a camera, a weight sensor, and a contamination sensor. Examples of the removal tools include, but are not limited to, a vacuum tool and a cutting tool. In some embodiments, the cutting tool and the vacuum tool, as well as other tools that may be implemented with the vacuum and the cutting tools, are included in a common robot arm. The robot arm may be used to selectively remove defective seeds and/or plants from an area of the tray to prevent the growth of one or more defective seeds and/or plants. Such a system may more efficiently produce healthy plants from healthy seeds by culling the defective seeds and plants, thereby increasing production yields and reducing the amount of resources used to produce healthy seeds and plants.

What is claimed is:

1. A system for removing seeds, the system comprising:
a track;
one or more carts moveably disposed on the track;
one or more trays disposed on the one or more carts, each of the one or more trays comprising a plurality of cells;
one or more sensors associated with the plurality of cells;
a removing device; and
a controller comprising:
one or more processors;
one or more memory modules; and
machine readable instructions stored in the one or more memory modules that, when executed by the one or more processors, cause the controller to:
determine a location of one or more of one or more contaminated seeds and one or more contaminated plants on the one or more carts based on information received from the one or more sensors; and
instruct the removing device to remove one or more of the one or more contaminated seeds and the one or more contaminated plants based on the location.

2. The system of claim 1, wherein the removing device is a vacuum robot arm.

3. The system of claim 1, wherein:
the machine readable instructions stored in the one or more memory modules, when executed by the one or more processors, cause the controller to:
determine an area with contamination or other impurities in one or more cells on a cart based on input from the one or more sensors; and
control the removing device to remove one or more of the one or more contaminated seeds and the one or more contaminated plants.

4. The system of claim 1, wherein each cell supports one or more of one or more seeds and one or more plants.

5. The system of claim 4, wherein the one or more sensors comprise one or more of a contaminant sensor and a weight sensor.

6. The system of claim 5, wherein the weight sensor is configured to measure a weight of one or more seeds based on one or more of the weight of individual cells and the weight of the one or more trays.

7. The system of claim 5, wherein the contaminant sensor is disposed within an individual cell of the plurality of cells in a tray on each of the one or more carts.

8. The system of claim 1, wherein the track resides in a grow pod and includes an ascending portion, a connecting portion, and a descending portion.

9. The system of claim 8, wherein the track comprises a top and a bottom, and a camera is configured to travel along a bottom of the track.

10. The system of claim 9, wherein:
the camera is configured to receive visual data about one or more of one or more seeds and one or more plants, and
the machine readable instructions stored in the one or more memory modules, when executed by the one or more processors, cause the controller to control the removing device to remove one or more of the one or more contaminated seeds and the one or more contaminated plants based on the visual data.

11. The system of claim 10, wherein the removing device is one or more of a vacuum robot arm and a cutting robot arm.

12. The system of claim 10, wherein the camera is configured to move along the bottom of the track and movement of the camera is associated with movement of the one or more carts.

13. A method of removing one or more of contaminated seeds and contaminated plants from a cart comprising one or more trays travelling along a track in a grow pod, the method comprising:
receiving, by a controller of the grow pod, data from one or more sensors associated with one or more cells of the one or more trays;
determining, by the controller of the grow pod, one or more contaminated seeds and one or more contaminated plants based on data from the one or more sensors;
determining, by the controller of the grow pod, a location of one or more of the one or more contaminated seeds and the one or more contaminated plants in response to a determination of the one or more contaminated seeds and the one or more contaminated plants; and
transmitting, by the controller of the grow pod, an instruction for removing one or more of the one or more contaminated seeds and the one or more contaminated plants based on the location.

14. The method of claim 13, wherein the determination of one or more contaminated seeds is based on a weight of one or more of an individual cell and a group of cells.

15. The method of claim 13, further comprising detecting via a contaminant sensor a contamination within an individual cell of the one or more cells.

16. The method of claim 13, wherein one or more of the one or more contaminated seeds and the one or more contaminated plants are removed with a vacuum robot arm.

17. The method of claim 13, wherein one or more of the one or more contaminated seeds and the one or more contaminated plants are removed with a cutting robot arm.

18. A grow pod for growing one or more plants, the grow pod comprising:
a track comprising a plurality of curved track sections and a plurality of straight track sections;
one or more carts moveably disposed on the track;
one or more trays disposed on the one or more carts, each of the one or more trays comprising a plurality of cells;
one or more sensors associated with the plurality of cells;
a removing device; and
a controller comprising:
one or more processors;
one or more memory modules; and
machine readable instructions stored in the one or more memory modules that, when executed by the one or more processors, cause the controller to:

determine a location of one or more of one or more contaminated seeds and one or more contaminated plants on the one or more carts based on information received from the one or more sensors; and instruct the removing device to remove one or more of the one or more contaminated seeds and the one or more contaminated plants based on the location.

19. The grow pod of claim 18, wherein:

the track comprises a top and a bottom, the one or more sensors comprise a camera, the one or more carts are disposed on the top of the track, the camera is disposed on the bottom of the track, the camera generates visual data associated with one or more of the one or more contaminated seeds and the one or more contaminated plants, and the machine readable instructions stored in the one or more memory modules, when executed by the one or more processors, cause the removing device to remove one or more of the one or more contaminated seeds and the one or more contaminated plants based on the visual data.

20. The grow pod of claim 19, wherein the camera is configured to travel along the track and in a direction perpendicular to the track.

* * * * *